United States Patent
Zhao et al.

(10) Patent No.: US 10,649,270 B2
(45) Date of Patent: May 12, 2020

(54) COLOR FILTER SUBSTRATE, DISPLAY PANEL AND DISPLAY APPARATUS CONTAINING THE COLOR FILTER SUBSTRATE

(71) Applicant: BOE TECHNOLOGY GROUP CO., LTD., Beijing (CN)

(72) Inventors: Weili Zhao, Beijing (CN); Jae Geon You, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/973,856

(22) Filed: May 8, 2018

(65) Prior Publication Data
US 2019/0025641 A1    Jan. 24, 2019

(30) Foreign Application Priority Data
Jul. 21, 2017   (CN) .......................... 2017 1 0601880

(51) Int. Cl.
| | |
|---|---|
| G02F 1/1335 | (2006.01) |
| G02F 1/13363 | (2006.01) |
| G02F 1/1343 | (2006.01) |
| G02F 1/1368 | (2006.01) |

(52) U.S. Cl.
CPC ...... G02F 1/133528 (2013.01); G02F 1/1368 (2013.01); G02F 1/13363 (2013.01); G02F 1/13439 (2013.01); G02F 1/133514 (2013.01); G02F 2001/133531 (2013.01); G02F 2001/133548 (2013.01); G02F 2001/133631 (2013.01); G02F 2413/01 (2013.01); G02F 2413/05 (2013.01)

(58) Field of Classification Search
CPC ................................................. G02F 1/133528
See application file for complete search history.

(56) References Cited

U.S. PATENT DOCUMENTS

| | | | |
|---|---|---|---|
| 9,064,763 B2 | 6/2015 | Ozawa et al. | |
| 9,093,660 B2 | 7/2015 | Yang et al. | |

(Continued)

FOREIGN PATENT DOCUMENTS

| | | |
|---|---|---|
| CN | 103579283 A | 2/2014 |
| CN | 203496357 U | 3/2014 |

(Continued)

OTHER PUBLICATIONS

Chinese Office Action in corresponding Chinese Application No. 201710601880.1 dated Aug. 1, 2019 (an English translation attached hereto). 16 pages.

*Primary Examiner* — Edmond C Lau
(74) *Attorney, Agent, or Firm* — Leason Ellis LLP

(57) ABSTRACT

A color filter substrate, a display panel and a display apparatus containing the color filter substrate are provided. The color filter substrate includes a color filter layer, a phase difference layer and a first wire grid polarizer arranged in sequence, the phase difference layer including a plurality of first phase shift structures and a plurality of second phase shift structures arranged alternately, the phase difference layer allowing P light that passes through the first phase shift structures and P light that passes through the second phase shift structures to have a phase difference.

15 Claims, 2 Drawing Sheets

(56) References Cited

U.S. PATENT DOCUMENTS

2008/0143638 A1\* 6/2008 Kim .................. G02F 1/133528
345/6
2017/0017114 A1\* 1/2017 Choi ................. G02F 1/133528
2018/0335666 A1\* 11/2018 Yoon ................. G02F 1/133528

FOREIGN PATENT DOCUMENTS

| CN | 105355637 A | 2/2016 |
| CN | 106405927 A | 2/2017 |
| WO | 2008075818 A1 | 6/2008 |

\* cited by examiner

COLOR FILTER SUBSTRATE, DISPLAY PANEL AND DISPLAY APPARATUS CONTAINING THE COLOR FILTER SUBSTRATE

CROSS REFERENCE TO RELATED APPLICATIONS

The present application entitled "Color Filter Substrate, Display Panel and Display Apparatus Containing the Color Filter Substrate" claims priority of Chinese Patent Application No. 201710601880.1 filed on Jul. 21, 2017 to SIPO, the disclosure of which is incorporated herein by reference in its entirety as part of the present application.

TECHNICAL FIELD

Embodiments of the present disclosure relate to a color filter substrate, a display panel and a display apparatus containing the color filter substrate.

BACKGROUND

WGPs (wire grid polarizers) are widely applied in display field, and metallic materials, such as Al, or the like, having relatively a high conductivity is adopted by wire grids. Wire grids of a wire grid polarizer are distributed with slits, namely a gap is formed between any adjacent wire grids.

SUMMARY

Embodiments of the present disclosure relate to a color filter substrate, a display panel and a display apparatus containing the color filter substrate.

At least one embodiment of the present disclosure provides a color filter substrate, comprising a color filter layer, a phase difference layer and a first wire grid polarizer arranged in sequence, the phase difference layer including a plurality of first phase shift structures and a plurality of second phase shift structures arranged alternately, the phase difference layer allowing P light that passes through the first phase shift structures and P light that passes through the second phase shift structures to have a phase difference.

For example, the phase difference between P light entering the first phase shift structures and exiting out of the first phase shift structures and P light entering the second phase shift structures and exiting out of the second phase shift structures is π, and S lights transmitted through the phase difference layer and the first wire grid polarizer sequentially has no phase difference.

For example, the first phase shift structures adopt a first medium, the second phase shift structures adopt a second medium, and the first medium and the second medium are uniaxial mediums with different refractivities, and satisfy following equations:

$$(Nxa-Nxb)*d=\lambda/2, (Nya-Nyb)*d=0;$$

where Nxa and Nxb represent refractivities in the first medium and the second medium in a direction parallel to the polarization direction of P lights, respectively, Nya and Nyb represent refractivities in the first medium and the second medium in a direction parallel to the polarization direction of S lights, respectively, d represents a thickness of the phase difference layer, and λ represents a wavelength of an incident light.

For example, both of the first phase shift structures and the second phase shift structures are strip-shaped.

For example, gaps are formed between two adjacent first phase shift structure and second phase shift structure in the phase difference layer, by a masking process.

For example, the first phase shift structures adopt a first medium, the second phase shift structures adopt a second medium, and the first medium and the second medium are uniaxial mediums with different refractivities, and satisfy following equations:

$$(Nxa-Nxb)*d=\lambda/2, (Nya-Nyb)*d=0;$$

where Nxa and Nxb represent refractivities in the first medium and the second medium in a direction parallel to the polarization direction of P lights, respectively, Nya and Nyb represent refractivities in the first medium and the second medium in a direction parallel to the polarization direction of S lights, respectively, d represents a thickness of the phase difference layer, and λ represents a wavelength of an incident light.

Embodiments of the present disclosure also provide a display panel, comprising an array substrate, a liquid crystal layer and the color filter substrate according to claim 1 arranged in sequence.

For example, the liquid crystal layer comprises liquid crystals in a Vertical Alignment (VA) mode or a Twisted Nematic (TN) mode, and the display panel further comprises an ITO layer provided below the first wire grid polarizer.

For example, the array substrate comprises a thin film transistor (TFT) layer, a second wire grid polarizer and a base substrate arranged in sequence, or, the array substrate comprises a thin film transistor (TFT) layer, a base substrate and a second wire grid polarizer arranged in sequence.

For example, wire grids of the first wire grid polarizer and the second wire grid polarizer are orthogonal to each other.

Embodiments of the present disclosure also provide a display apparatus, comprising the display panel.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Hereinafter, technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, a person of ordinary skill in the art can obtain other embodiment(s), without any creative work, which shall be fall within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," "left," "right," or the like are only used to indicate relative position relationship, and when the position of the object which is described is changed, the relative position relationship may be changed accordingly.

Figure 1:
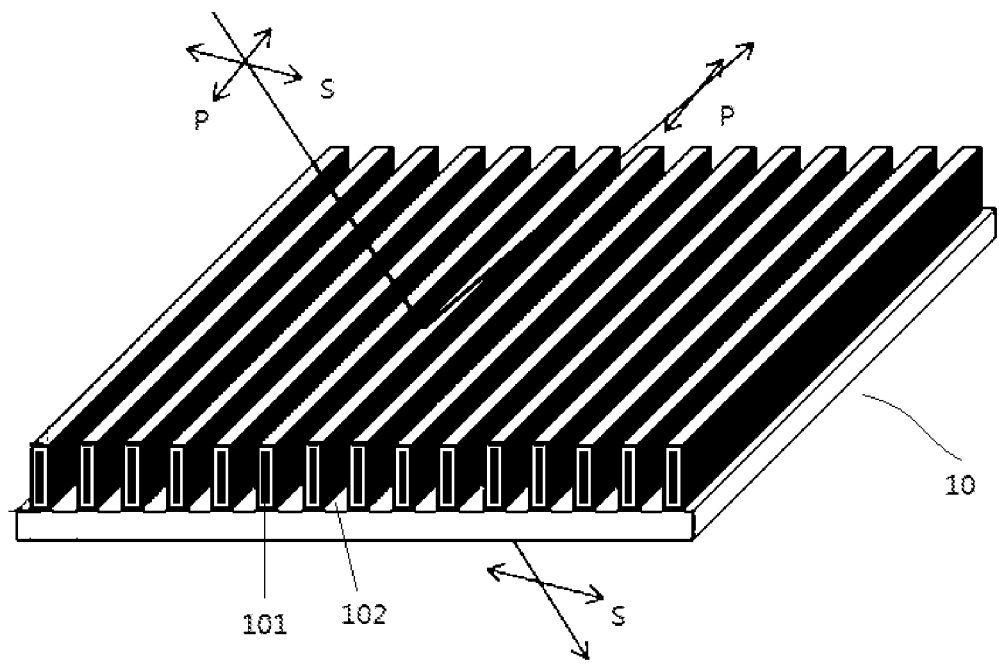
FIG. 1 is a schematic view illustrating the beam splitting principle of a wire grid polarizer.

In a structure of a wire grid polarizer 10 with slits as shown in FIG. 1, a gap 102 is formed between any adjacent wire grids 101, each of the wire grids has a width about 50 nm, each of the gaps 102 has a width about 50 nm, and each of the wire grids has a height about 150 nm. The beam splitting principle of a wire grid polarizer is that, when an external natural light (which may be considered to be formed by combining orthogonal lights within a plane perpendicular to the propagation direction) irradiates on a surface of the wire grid polarizer, a light parallel to a wire-grid gap (i.e. P light) is reflected, and a light perpendicular to the wire-grid gap (i.e. S light) is reflected.

A wire grid polarizer differs from a conventional absorptive polarizer. The conventional absorptive polarizer use transmission and absorption to obtain a polarized light, while P light emitted by a panel in the wire grid polarizer is reflected secondarily by a TFT substrate to turn into S light after it has been reflected, so it can be used continually. Consequently, brightness of the panel is improved. However, when a wire grid polarizer is used on the color filter side, contrast of the panel will be reduced after an ambient light is reflected by the wire grid polarizer.

Figure 2A:
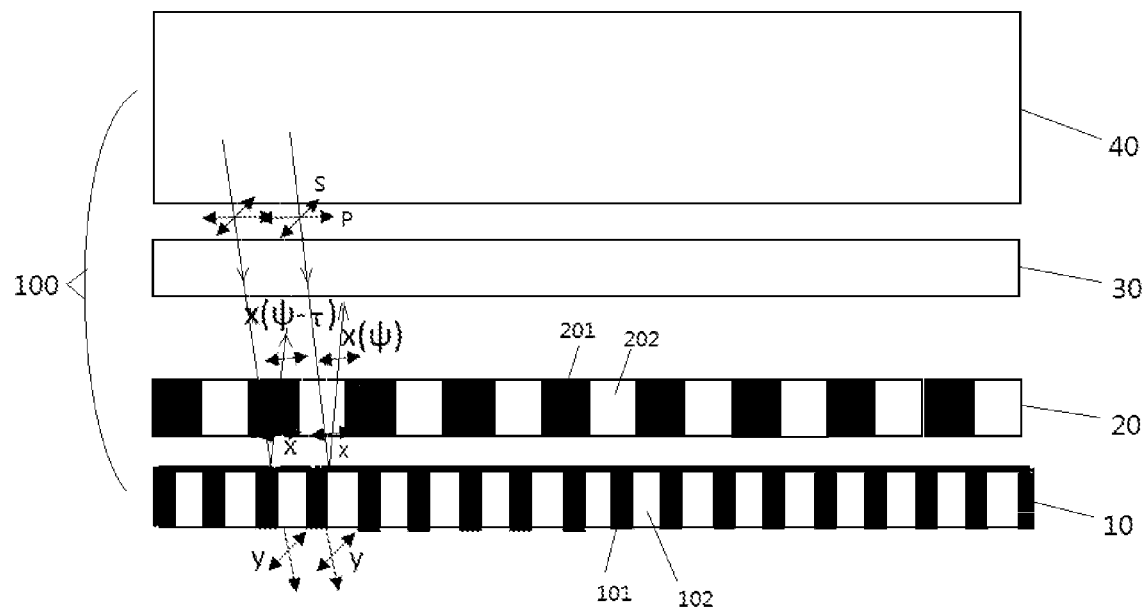
FIG. 2a is an exploded schematic view illustrating a color filter substrate according to an example of the present disclosure.

As shown in FIG. 2a, a color filter substrate 100 according to an embodiment of the present disclosure includes an upper substrate layer 40, a color filter layer 30, a phase difference layer 20 and a first wire grid polarizer 10 that are disposed in sequence. For example, the phase difference layer 20 includes a plurality of a first phase-shift structures 201 and a plurality of second phase-shift structures 202 that are disposed alternately. For example, the first phase-shift structures 201 and the second phase-shift structures 202 are disposed alternately in the width direction of the phase difference layer 20. The first wire grid polarizer 10 includes a plurality of wire grids 101, and a wire-grid gap 102 is formed between any two adjacent wire grids 101. An incident light can be considered to be formed by combining orthogonal lights (i.e. P light and S light) that lie within a plane perpendicular to its propagation direction. When the incident light is irradiated onto a surface of the first wire grid polarizer 10, a light parallel to the wire-grid gap 102 (i.e. P light along the x direction in the figure) is reflected, and a light perpendicular to the wire-grid gap 102 (i.e. S light along the y direction in the figure) is refracted and pass through the first wire grid polarizer 10. The phase difference layer 20 can allow P light passing through the first phase-shift structure 201 and P light passing through the second phase-shift structure 202 to create a phase difference, X ($\Psi-\tau$) and X ($\Psi$) in the figure represent wave functions of P light enters the first phase-shift structures 201 and exits out of the first phase-shift structures 201, and P light enters the second phase-shift structures 202 and exits out of the second phase-shift structures 202, respectively, wherein T represents a phase difference.

In the color filter substrate 100 provided by an embodiment of the present disclosure, the phase difference layer 20 can allow P light passing through the first phase-shift structures 201 and P light passing through the second phase-shift structures 202 to create a phase difference, and as a result, a destructive interference happens between P light that is reflected by the first wire grid polarizer 10 and passes through the first phase-shift structures 201 to exit and P light that is reflected by the first wire grid polarizer 10 and passes through the second phase-shift structures 202 to exit on a side near the color filter layer 30. In this way, the light reflecting effect of the color filter substrate 100 is decreased.

For example, the phase difference layer 20 can enable the phase difference between P light entering the first phase-shift structures 201 and exiting out of the first phase-shift structures 201 and P light entering the second phase-shift structures 202 and exiting out of the second phase-shift structures 202 to be $\pi$, in other words, the phase difference between P light that is reflected by the first wire grid polarizer 10 after entering the first phase-shift structures 201 and passes through the first phase-shift structures 201 to exit and P light that is reflected by the first wire grid polarizer 10 after entering the second phase-shift structures 202 and passes through the second phase-shift structures 202 to exit is $\pi$. Consequently, P light that is reflected by the first wire grid polarizer 10 after entering the first phase-shift structures 201 and passes through the first phase-shift structures 201 to exit and P light that is reflected by the first wire grid polarizer 10 after entering the second phase-shift structures 202 and passes through the second phase-shift structures 202 to exit can be completely destructed due to interference on a side near the color filter layer 30. In this way, the light reflecting effect is reduced. Furthermore, S lights that are transmitted by the phase difference layer 20 and the first wire grid polarizer 10 have no phase difference, so the display brightness of S lights is not affected.

For example, the first phase-shift structures 201 adopt a first medium, the second phase-shift structures 202 adopt a second medium, and the first medium 201 and the second medium 202 are uniaxial mediums with different refractivities, which satisfy conditions: (Nxa−Nxb)*d=$\lambda$/2, (Nya−Nyb)*d=0, where Nxa and Nxb represent refractivities in the first and second mediums in a direction parallel to the polarization direction of P lights, respectively, Nya and Nyb represent refractivities in the first and second mediums in a direction parallel to the polarization direction of S lights, respectively, d represents a thickness of the phase difference layer, and $\lambda$ represents a wavelength of an incident light.

Under (Nxa−Nxb)*d=$\lambda$/2, a phase difference $\tau p=2*\pi*\lambda/2/\lambda=\pi$ is created between P light that is reflected by the first wire grid polarizer 10 after entering the first medium 201 and passes through the first medium 201 to exit and P light that is reflected by the first wire grid polarizer 10 after passing through the second medium 202 and passes through the second medium 202 to exit on a side near the color filter layer 30. That is, P light entering the first medium 201 and exiting out of the first medium 201 again and P light entering the second medium 202 and exiting out of the second medium after that are completely cancelled. Moreover, Under (Nya−Nyb)*d=0, S light that is transmitted through the phase difference layer 20 and the first wire grid polarizer 10 satisfies $\tau$s=0, namely S lights have no phase difference, no destructive effect. As a result, the display brightness of S light is not affected.

For example, each of the first phase-shift structures 201 and the second phase-shift structures 202 are strip-shaped.

For example, in the phase difference 20, gaps are formed between two adjacent first phase-shift structures 201 and second phase-shift structures 202 by a masking process, so as to form connected strip-like gaps.

Figure 3:
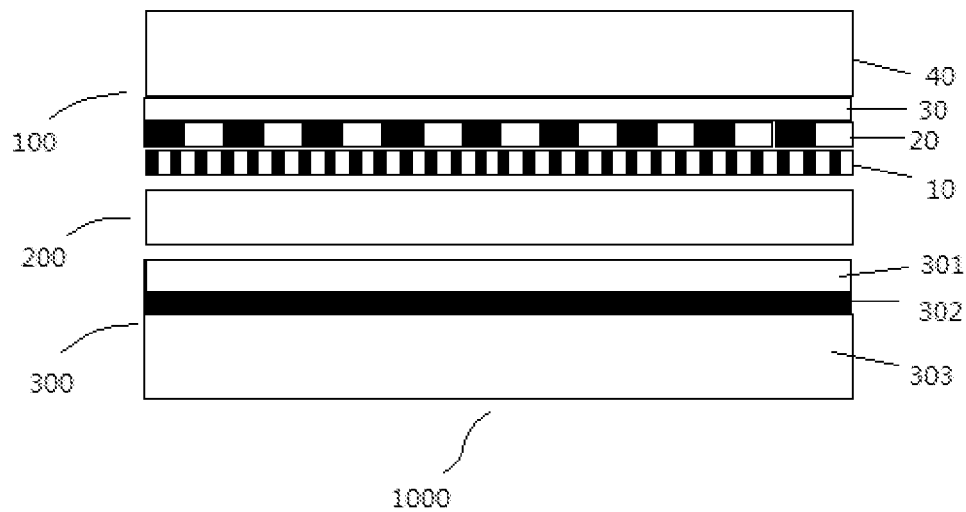
FIG. 3 is an exploded schematic view illustrating a display panel according to an example of the present disclosure.

Further, for example, as shown in FIG. 3, a display panel 1000 is also provided in an embodiment of the present disclosure. The display panel 1000 may be a light-emitting diode (LED) panel, an organic light-emitting diode (OLED) panel or the like. The display panel 1000 includes an array substrate 300, a liquid crystal layer 200 and a color filter substrate 100 disposed in sequence.

The display panel 1000 includes the color filter substrate 100, the display panel 1000 has merits possessed by the color filter substrate. That is, the light reflecting effect is reduced, and display brightness of the display panel 1000 is not affected.

Figure 2B:
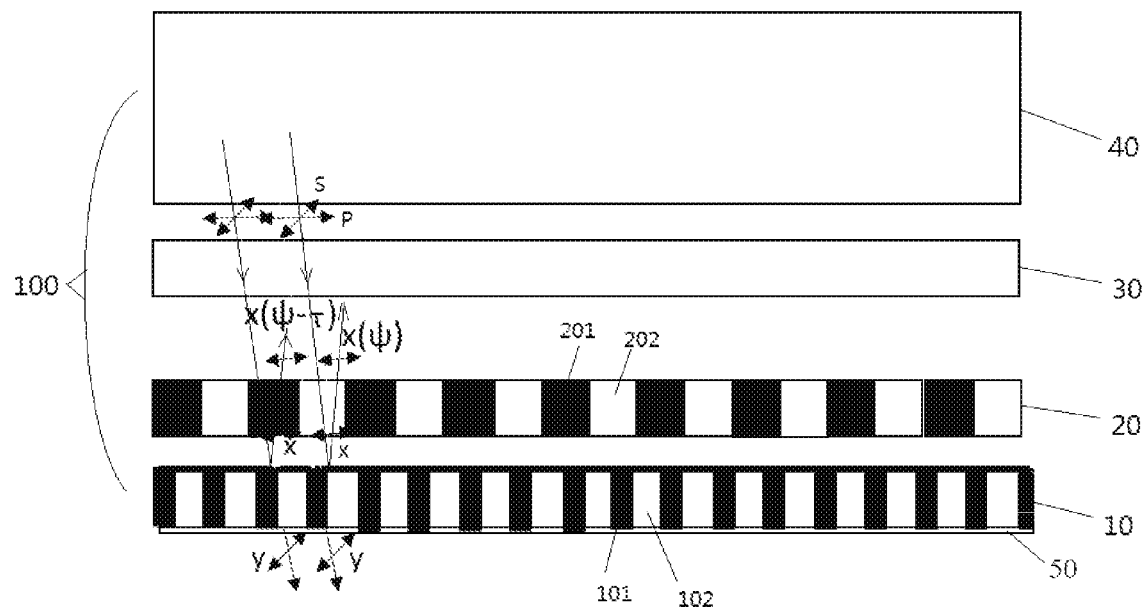
FIG. 2b is an exploded schematic view illustrating a color filter substrate according to another example of the present disclosure.

For example, the liquid crystal layer 200 may adopt liquid crystals in the mode of In-Plane Switching (IPS), Vertical Alignment (VA) or Twisted Nematic (TN). And when the liquid crystal layer adopts liquid crystals in the mode of VA or TN, the display panel 1000 may also include an Indium Tin Oxide (ITO) layer 50 disposed below the first wire grid polarizer 10, to enhance transmittance, as shown in FIG. 2b.

For example, the array substrate 300 includes a TFT (Thin Film Transistor) layer 301, a second wire grid polarizer 302, and a base substrate 303 that are disposed in sequence. Positions of the second polarizer 302 and the base substrate 303 can be exchanged, while in an instance that the base substrate 303 lies between the TFT layer 301 and the second wire grid polarizer 302, the second wire grid polarizer 302 can be substituted by a conventional polarizer.

For example, the base substrate 303 may be a glass substrate, quartz, or a flexible substrate.

For example, wire grids of the first wire grid polarizer 10 and the second wire grid polarizer 302 are orthogonal to each other, that is, wire-grid gaps of the two grid polarizers are orthogonal, so that polarized light with a specific polarization direction can be selected.

According to an embodiment of the present disclosure, a display apparatus is also provided. The display apparatus may be an electronic paper, a cell phone, tablet computer, television, display, notebook computer, digital photo frame, navigator or other product or component having a display function. The display apparatus includes the display panel 1000, the display apparatus also have the merits possessed by the display panel 1000, and details are not repeated here.

In the color filter substrate provided by embodiments of the present disclosure, the phase difference layer can permit P light passing through the first phase-shift structures 201 and P light passing through the second phase-shift structures 202 to create a phase difference, and as a result, the interference is destructed between P light that is reflected by the first wire grid polarizer and exits out of the first phase-shift structure and P light that is reflected by the first wire grid polarizer and exits out of the second phase-shift structures 202 on a side near the color filter layer. In this way, the light reflecting effect of the color filter substrate can be reduced.

By using a first medium as the first phase-shift structures and using a second medium as the second phase-shift structures, on one hand, due to (Nxa−Nxb)*d=λ/2, a phase difference τp=2*π*λ/2/λ=π is generated between P light that is reflected by the first wire grid polarizer after entering the first phase-shift structures and passes through the first phase-shift structure to exit and P light that is reflected by the first wire grid polarizer after passing through the second phase-shift structures and passes through the second phase-shift structures to exit on a side near the color filter layer, namely P light reflected by the first wire grid polarizer after it enters the first phase-shift structure and exiting out of the first phase-shift structures and P light reflected by the first wire grid polarizer after it enters the second phase-shift structures and exiting out of the second phase-shift structures are completely cancelled; in addition, due to (Nya−Nyb)*d=0, S light that is transmitted through the phase difference layer and the first wire grid polarizer satisfies τs=0, namely S lights have no phase difference, and no destructive effect. As a result, the display brightness of the S lights is not affected.

The display apparatus and the display panel according to embodiments of the present disclosure each include the color filter substrate, and each has the merits possessed by the color filter substrate. That is, the light reflecting effect is reduced, and the display brightness is not affected.

The foregoing is only the exemplary embodiments of the present disclosure, but the scope of the present disclosure is not limited thereto. A person of ordinary skill in the art can make various changes and modifications without departing from the spirit of the present disclosure, and such changes and modifications shall fall into the scope of the present disclosure.

What is claimed is:

1. A color filter substrate, comprising a color filter layer, a phase difference layer and a first wire grid polarizer arranged in sequence, the phase difference layer including a plurality of first phase shift structures and a plurality of second phase shift structures arranged alternately, the phase difference layer allowing P light that passes through the first phase shift structures and P light that passes through the second phase shift structures to have a phase difference; wherein the phase difference between P light entering the first phase shift structures and exiting out of the first phase shift structures and P light entering the second phase shift structures and exiting out of the second phase shift structures is π, and S lights transmitted through the phase difference layer and the first wire grid polarizer sequentially has no phase difference.

2. The color filter substrate according to claim 1, wherein the first phase shift structures adopt a first medium, the second phase shift structures adopt a second medium, and the first medium and the second medium are uniaxial mediums with different refractivities, and satisfy following equations:

$$(Nxa-Nxb)*d=\lambda/2, (Nya-Nyb)*d=0;$$

where Nxa and Nxb represent refractivities in the first medium and the second medium in a direction parallel to the polarization direction of P lights, respectively, Nya and Nyb represent refractivities in the first medium and the second medium in a direction parallel to the polarization direction of S lights, respectively, d represents a thickness of the phase difference layer, and represents a wavelength of an incident light.

3. The color filter substrate according to claim 1, wherein both of the first phase shift structures and the second phase shift structures are strip-shaped.

4. The color filter substrate according to claim 1, wherein gaps are formed between two adjacent first phase shift structure and second phase shift structure in the phase difference layer, by a masking process.

5. A display panel, comprising an array substrate, a liquid crystal layer and a color filter substrate; wherein the color filter substrate comprises:

a color filter layer, a phase difference layer and a first wire grid polarizer arranged in sequence, the phase difference layer including a plurality of first phase shift structures and a plurality of second phase shift structures arranged alternately, the phase difference layer allowing P light that passes through the first phase shift structures and P light that passes through the second phase shift structures to have a phase difference;

wherein the phase difference between P light entering the first phase shift structures and exiting out of the first phase shift structures and P light entering the second phase shift structures and exiting out of the second phase shift structures is π, and S lights transmitted through the phase difference layer and the first wire grid polarizer sequentially has no phase difference.

6. The display panel according to claim 5, wherein the liquid crystal layer comprises liquid crystals in a Vertical Alignment (VA) mode or a Twisted Nematic (TN) mode, and the display panel further comprises an ITO layer provided below the first wire grid polarizer.

7. The display panel according to claim 5, wherein the array substrate comprises a thin film transistor (TFT) layer, a second wire grid polarizer and a base substrate arranged in sequence, or, the array substrate comprises a thin film transistor (TFT) layer, a base substrate and a second wire grid polarizer arranged in sequence.

8. The display panel according to claim 7, wherein wire grids of the first wire grid polarizer and the second wire grid polarizer are orthogonal to each other.

9. The display panel according to claim 5, wherein the first phase shift structures adopt a first medium, the second phase shift structures adopt a second medium, and the first medium and the second medium are uniaxial mediums with different refractivities, and satisfy following equations:

$(Nxa-Nxb)*d=\lambda/2, (Nya-Nyb)*d=0;$ where Nxa and Nxb represent refractivities in the first medium and the second medium in a direction parallel to the polarization direction of P lights, respectively, Nya and Nyb represent refractivities in the first medium and the second medium in a direction parallel to the polarization direction of S lights, respectively, d represents a thickness of the phase difference layer, and represents a wavelength of an incident light.

10. The display panel according to claim 5, wherein both of the first phase shift structures and the second phase shift structures are strip-shaped.

11. The display panel according to claim 5, wherein gaps are formed between two adjacent first phase shift structure and second phase shift structure in the phase difference layer, by a masking process.

12. A display apparatus, comprising a display panel, wherein the display panel comprises: an array substrate, a liquid crystal layer and a color filter substrate;

wherein the color filter substrate comprises:

a color filter layer, a phase difference layer and a first wire grid polarizer arranged in sequence, the phase difference layer including a plurality of first phase shift structures and a plurality of second phase shift structures arranged alternately, the phase difference layer allowing P light that passes through the first phase shift structures and P light that passes through the second phase shift structures to have a phase difference;

wherein the phase difference between P light entering the first phase shift structures and exiting out of the first phase shift structures and P light entering the second phase shift structures and exiting out of the second phase shift structures is π, and S lights transmitted through the phase difference layer and the first wire grid polarizer sequentially has no phase difference.

13. The display apparatus according to claim 12, wherein the first phase shift structures adopt a first medium, the second phase shift structures adopt a second medium, and the first medium and the second medium are uniaxial mediums with different refractivities, and satisfy following equations:

$(Nxa-Nxb)*d=\lambda/2, (Nya-Nyb)*d=0;$ where Nxa and Nxb represent refractivities in the first medium and the second medium in a direction parallel to the polarization direction of P lights, respectively, Nya and Nyb represent refractivities in the first medium and the second medium in a direction parallel to the polarization direction of S lights, respectively, d represents a thickness of the phase difference layer, and represents a wavelength of an incident light.

14. The display apparatus according to claim 12, wherein both of the first phase shift structures and the second phase shift structures are strip-shaped.

15. The display apparatus according to claim 12, wherein gaps are formed between two adjacent first phase shift structure and second phase shift structure in the phase difference layer, by a masking process.

* * * * *